Nov. 12, 1968 H. G. CRAGON ET AL 3,411,145

MULTIPLEXING AND DEMULTIPLEXING OF RELATED TIME SERIES DATA RECORDS

Filed July 1, 1966

4 Sheets-Sheet 1

INVENTORS
HARVEY G. CRAGON
ROBERT G. COCHRAN
WILLIAM J. WATSON
PATRICK H. POE

BY [signature]

ATTORNEY

INVENTORS:
HARVEY G. CRAGON
ROBERT G. COCHRAN
WILLIAM J. WATSON
PATRICK H. POE
D. Carl Richards
ATTORNEY Nov. 12, 1968 H. G. CRAGON ET AL 3,411,145

MULTIPLEXING AND DEMULTIPLEXING OF RELATED TIME SERIES DATA RECORDS

Filed July 1, 1966 4 Sheets-Sheet 3

INVENTORS
HARVEY G. CRAGON
ROBERT G. COCHRAN
WILLIAM J. WATSON
PATRICK H. POE

ATTORNEY

INVENTOR
HARVEY G. CRAGON
ROBERT G. COCHRAN
WILLIAM J. WATSON
PATRICK H. POE
S. Carl Richards
ATTORNEY United States Patent Office 3,411,145

Patented Nov. 12, 1968

3,411,145

MULTIPLEXING AND DEMULTIPLEXING OF RELATED TIME SERIES DATA RECORDS

Harvey G. Cragon, Dallas, Robert G. Cochran and William J. Watson, Richardson, and Patrick H. Poe, Houston, Tex., assignors to Texas Instruments Incorporated, Dallas, Tex., a corporation of Delaware Filed July 1, 1966, Ser. No. 562,257
7 Claims. (Cl. 340—172.5)

This invention relates to a data processor in which means are provided for demultiplexing input data and multiplexing output data such as obtained from seismic records.

Multichannel seismic field records are commonly recorded in a time-multiplexed form on magnetic tape. In U.S. Patent No. 3,074,636 to Baker et al., means are disclosed for use of such data wherein seismic records on magnetic tapes are transferred onto a special magnetic tape loop. The data on the magnetic loop is treated by a processor. Since one of the important considerations in computer operations is expenditure of time, efficient communication of data to and from the computer is important. Time series other than seismograms which present a similar problem include medical data, wind tunnel test results, and telemetering signals and the like.

The present invention is particularly useful for handling a plurality of time series which are applied to the computer system in multiplexed form. In this aspect, the invention is directed to partial demutliplexing by an arithmetic computer unit with completion of the demultiplexing in a unique drum storage system.

In accordance with one aspect of this invention, a seismic field record or its equivalent may be demutliplexed by reproducing a multiplexed record continuously during one pass thereof and storing the same in a section of a magnetic core. A data processor in the computer system performs a partial demultiplexing of the data and stores it in another section of the core memory. Thereafter, the data is stored on a magnetic drum. The system leading to the drum is arranged to permit direct reading of data from the drum in completely demutliplexed order.

More particularly, this invention provides for demultiplexing time series information signals from a multiplexed digital signal which appears in successive time blocks, with each block including representations of all signal channels multiplexed. The multiplexed digital signal is continuously loaded into a core storage buffer area which provides capacity for two submatrices of the data, where each submatrix is made up of a plurality of such blocks. An arithmetic unit successively transposes the submatrices in the order stored in said storage. A second core storage buffer area of similar capacity receives the transposed submatrices. A drum is provided with control means for storing different channels of the first transposed submatrix from the second core storage on separate tracks on the drum and for storing like channels of the second transposed submatrix on the same track on the drum, each contiguous to the corresponding channel of the first transposed submatrix. By this means, the components of the multiplexed time series are separated and stored on separate drum tracks and may be read directly from the drum in proper order.

A plurality of time series may be multiplexed by reversal of the foregoing order.

For a more complete understanding of the present invention and for further objects and advantages thereof, reference may now be had to the following description taken in conjunction with the accompanying drawings in which:

FIGURE 1 is a portion of a mutlitrace record of time varying signals;

FIGURE 2 diagrammatically illustrates the invention;

Figures 1, 2:
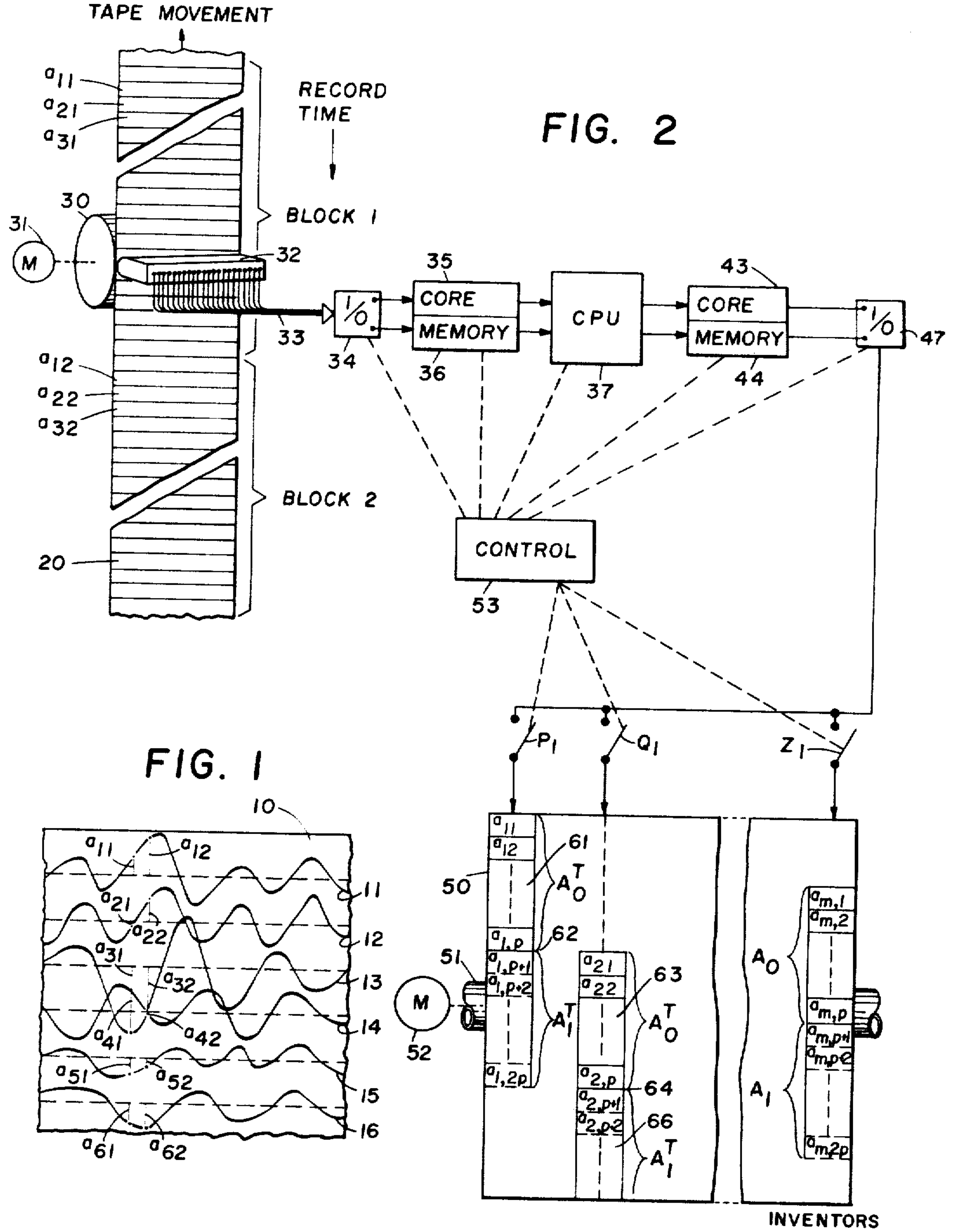

In FIGURE 1 a fragment of a wiggle trace seismic record 10 is shown. Such recordings generally are in phonographically reproducible form, as on magnetic tape, for input to a processor such as a computer. By way of example, in seismic exploration twenty-four or more signal channels may be employed on a given record rather than only six traces 11–16 as shown in FIGURE 1. In producing a digitized seismogram, the amplitudes of traces 11–16 are sampled at equally spaced time intervals.

In accordance with U.S. Patent No. 3,075,607 to Aitken et al. and U.S. Patent No. 3,074,636 to Baker et al., seismic signals are digitized, multiplexed and recorded on a single record such as on a magnetic tape 20 of FIGURE 2. Multiplexing is accomplished either concurrently with production of a wiggle trace record or independently of such a record. In either case, signals are recorded as blocks of digital information on a tape. For example, the first word $a_{11}$ on tape 20 is the amplitude $a_{11}$ of trace 1, FIGURE 1. The second word $a_{21}$ on tape 20 is the amplitude $a_{21}$ of trace 2, FIGURE 1. Similarly, each of the traces 13–16 is sampled, the result is digitized and the repersentation thereof is stored on magnetic tape 20.

As described in said Baker et al. patent, the data on the tape 20 may be accompanied by a clock track and block marker track. Markers on the latter track divide the record into blocks. Only two of many blocks from a seismogram, the blocks 1 and 2, are represented in FIGURE 2. A six-second 24-trace seismic recording sampled at 0.002 second intervals and digitized would have $$\frac{6}{.002}=3,000$$

such blocks.

For the purpose of the present description, the number of traces will be designated as $m$. It follows that there will be $m$ words in each of blocks 1, 2, . . . N.

Figure 3:
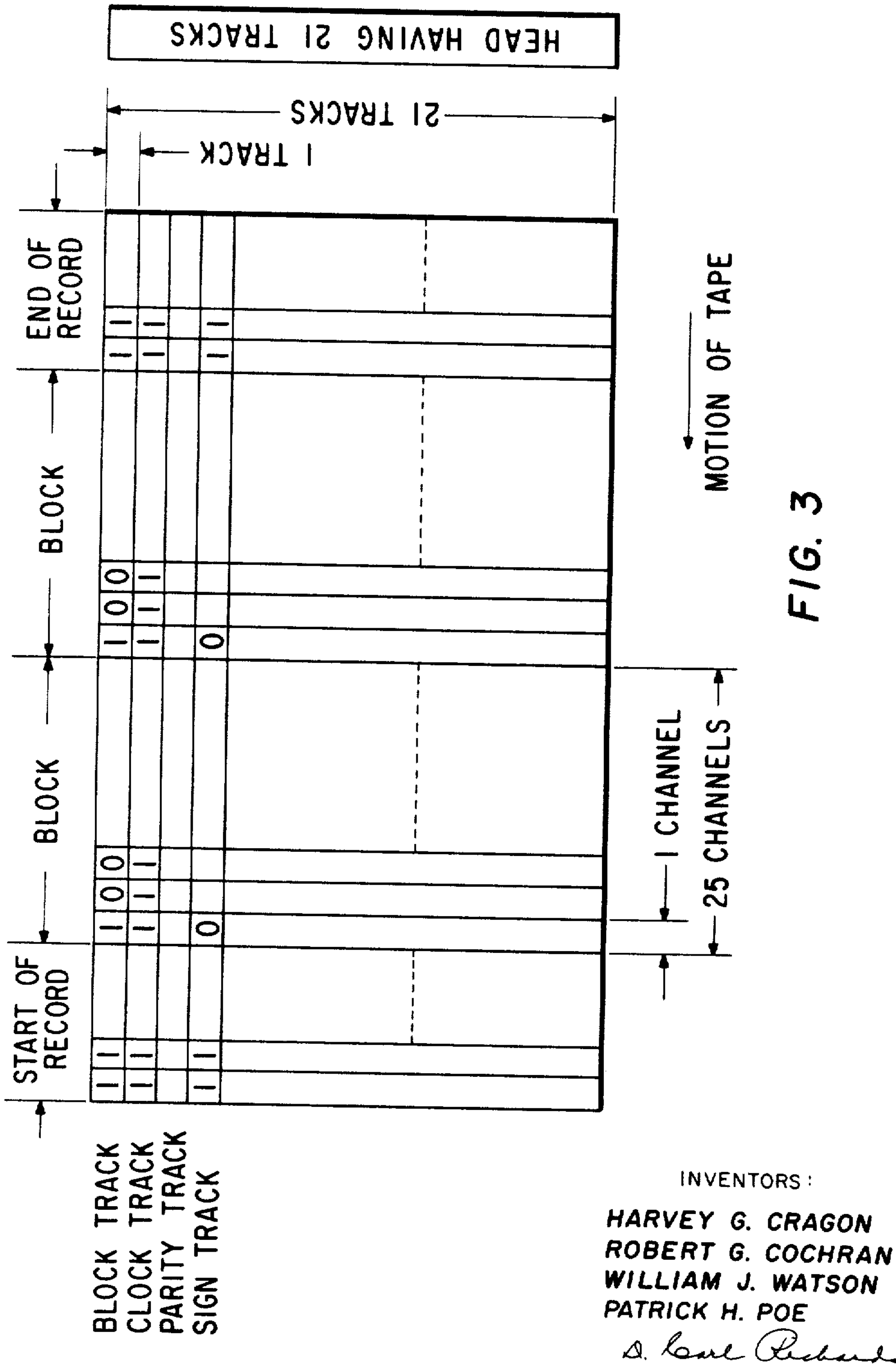
FIGURE 3 illustrates a magnetic tape format.

An example of a digital data format on magnetic tape is shown in FIGURE 3. Seismic data gathered in the field and arranged in such a format on reel tape is generally removed to a central processing station for computation and analysis.

In FIGURE 3, the blocks of words are arranged adjacent one another and the words within a block are adjacent one another. An individual reel tape unit may include as many as fifty records, wherein each record is composed of a start of record code, about 3000 blocks of words and an end of record code. FIGURE 3 illustrates one such record for a 24-trace recording. It includes a start of record section, only two blocks of data adjacent one another and an end of record section.

The record format is arranged in tracks and channels. There are twenty-one tracks and each block includes twenty-five channels. The number of channels in the start of record section and the end of record section is a matter of choice and these sections may be different lengths. Referring now to the block section of the record, the first channel in each block is referred to as the block word which specifies the number of the block and also identifies the channel as a block word. The block word indicates the beginning of a block of words.

The twenty-four remaining channels in each block are referred to as data words. Each channel includes eighteen data bits and three bits for control purposes, for example, the block bit (BB), clock bit (CB) and the parity bit. Hereinafter, the information in each channel is referred to as a word.

Illustrated in FIGURE 3 as the top three tracks in the record are the block, the clock and the parity tracks. The sign track provides a sign bit for each word and is included as one of the eighteen data bits.

Also, illustrated in FIGURE 3 is the motion of the tape in relation to the head as indicated by the arrow, whereby the words in the start of record section are read-out first, the block word, the data words and then another block word and so on.

The code unique to a block word is a "one" stored in the block bit which distinguishes it from data words which have "zeros" stored in the block track. Therefore, the one in the block track identifies the channel as a block word.

The information is read-out of the tape by parallel read-out, wherein a head 32, FIGURE 2, having twenty-one tracks therein is positioned across the length of a channel. A one stored in the magnetic tape is indicated by a flux change irrespective of the direction of that change. Therefore, a one is read-out of the magnetic tape by head 32 as a positive or negative pulse depending on the flux change. This merely requires the translation of the positive or negative pulse to a unipolar pulse for indicating the one.

Time series in multiplexed form are difficult to use. The present invention is directed to simplification of this problem at minimum computer time cost.

To illustrate the invention, a tape reader comprising a capstan 30 driven by motor 31 moves the tape past a multichannel read unit 32. The output of the read unit 32 is applied by way of channel 33 to an input-output (I/O) unit 34. Data is directed from the I/O unit 34 to a first section 35 of a magnetic core memory. The I/O unit 34 has access to section 35, as well as a second section 36.

In accordance with the invention, matrices made up of a plurality of data blocks are temporarily stored alternately in sections 35 and 36. Such matrices are transferred through the central processing unit 37 to core memory units 43 and 44 at which point the data is partially demultiplexed. Data stored in core memory sections 43 and 44 is then transferred by way of an I/O unit 47 to write heads associated with a storage drum 50. The storage drum 50 has a plurality of tracks. Information channels leading to each of the tracks include a ocntrol element diagrammatically represented by switches $P_1$, $Q_1$, . . . $Z_1$.

The drum 50 is mounted on a shaft 51 and is driven at a controlled speed by a motor 52. The motor 52 and the motor 31 driving capstan 30 are operated asynchronously, though they may be operated synchronously.

A control unit 53 is coupled by control channels to the I/O unit 34, the core memory units 35 and 36, the central processing unit 37, the core memory units 43 and 44, the I/O unit 47, and the channel controls $P_1$, $Q_1$, . . . $Z_1$.

Ultimately to be recorded on a given track on the drum 50 will be all of the data representing a given trace from record 10 of FIGURE 1, in the order in which that data appears on record 10. This transposition is to be made from a multiplexed record on magnetic tape 20 to the storage on drum 50 in a single pass of the tape 20 past the read unit 32, without preventing the central processing unit 37 from performing other work for a time interval any greater than the time required to drive the tape 20 past the read unit 32.

The first word $a_{11}$, block 1, record 20, is to be stored on track 1 on drum 50. The second word on track 1 is to be the first word $a_{12}$ of block 2, and so on, so that on track 1 the time spaced samples of trace 11 will appear seriatim.

Similarly, the word $a_{21}$ of block 1 is to be stored on track 2 of drum 50. The second word on track 2 is to be the second word $a_{22}$ of block 2 and so on, so that on track 2 the time spaced samples of trace 12 similarly will appear seriatim.

The operation of the central processing unit 37 and the drum 50 is based upon division of the entire seismic record recorded on tape 20 may be fully described in terms of the following seismic record matrix A.

$$A=\begin{bmatrix} a_{11} \ldots a_{12} \ldots\ldots\ldots a_{1,n} \\ a_{21} \ldots a_{22} \ldots\ldots\ldots \cdot \\ \cdot \qquad\qquad\qquad \cdot \\ \cdot \qquad\qquad\qquad \cdot \\ a_{m,1} \ldots\ldots\ldots\ldots a_{m,n} \end{bmatrix} \quad (1)$$

time→

This data, as it appears on the tape 20, is thus arranged in column order as follows:

$$a_{11}, a_{21} \ldots a_{m,1}; a_{12}, a_{22} \ldots a_{m,2} \ldots a_{1,n}, a_{2,n} \ldots a_{m,n} \quad (2)$$

The seismic record data matrix is partitioned into submatrices $A_i$ as follows:

$$A=[A_0, A_1 \ldots A_a] \quad (3)$$

where:

$$A_i=\begin{bmatrix} a_{1,pi+1} \ldots a_{1,pi+2} \ldots a_{1,pi+p} \\ a_{2,pi+1} \ldots a_{2,pi+2} \ldots \cdot \\ \cdot \qquad\qquad \cdot \\ \cdot \qquad\qquad \cdot \\ a_{m,pi+1} \ldots\ldots\ldots a_{m,pi+p} \end{bmatrix} \quad (4)$$

time→ where:

$p$ is the number of samples per submatrix; and
$i$ is the particular submatrix.

As tape 20 moves past the read unit 32, the first submatrix is stored in core section 35. During the next time interval, the second submatrix is stored in the second core section 36. During the latter time interval, the data in core section 35 is processed by the central processing unit (CPU) 37. It is transposed by the CPU 37 to occupy relationships in a submatrix $A_i^T$, as follows:

$$A_i^T=\begin{bmatrix} a_{1,pi+1} \cdots a_{2,pi+1} \cdots a_{m,pi+1} \\ a_{1,pi+2} \cdots a_{2,pi+2} \cdots \cdot \\ \cdot \qquad\qquad \cdot \\ \cdot \qquad\qquad \cdot \\ a_{1,pi+p} \qquad\qquad a_{m,pi+p} \end{bmatrix} \text{time}\downarrow \quad (5)$$

The first transposed submatrix is temporarily stored in buffer memory 43. The second transposed submatrix is subsequently stored in buffer memory 44.

In synchronism with rotation of the drum 50, the columns of the transposed matrices in sections 43 and 44 are successively stored on the appropriate tracks on drum 50. More particularly, the control unit $P_1$ is rendered conductive during the period that the segment 61 of the track 1 moves past the record head. Thus, the first column of the first transposed submatrix $A_O^T$ is stored in sector 61. At the instant the track location 62 passes the record head, the control $P_1$ is rendered inoperative and the control $Q_1$ is rendered operative. Thus, in the sector 63 of track 2 there is stored the second column of the first transposed submatrix $A_O^T$. Similarly, when the location 64 of the track 2 passes the record head, the control $Q_1$ is rendered operative. This operation is continued until all of the data represented by the various columns of the first transposed submatrix are stored on the different tracks on the drum 50. During the next rotational cycle of the drum 50, the first column of the second transposed submatrix stored in the buffer memory 44 is then recorded in the sector 65 of the track 1. Similarly, the second column of the second transposed submatrix from the buffer memory 44 is stored on sector 66 of track 2.

From the foregoing, it will be seen that the CPU 37 partially demultiplexes the data from the record 20 by transposing the submatrices alternately stored in buffer memory sections 35 and 36. The channel control units $P_1$, $Q_1$, . . . $Z_1$ are then actuated in synchronism with the drum 50 to complete the unscrambling of the multiplexed seismograms.

When this operation is completed, the data stored on track 1 on drum 50 may then be read out in the same time sequence as the corresponding time samples appear on the trace 11 of FIGURE 1. Similarly, track 2 may be read to reproduce in the order of the time samples of trace 12, to define the trace 12 as fully and completely as is possible for the spacing of the time samples selected.

Figure 4:
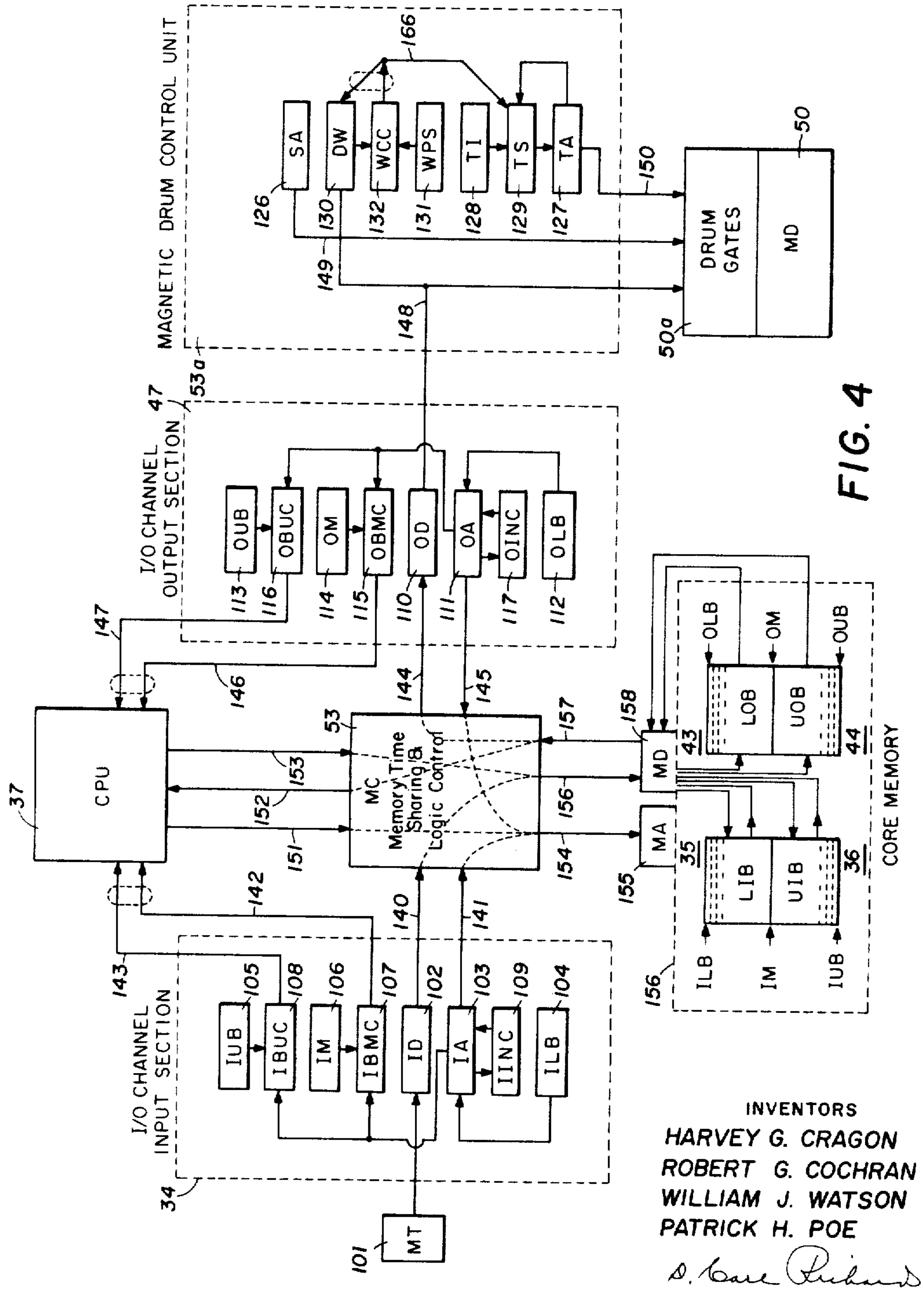
FIGURE 4 is a more detailed diagram of the system of FIGURE 2.

FIGURE 4 illustrates the computer system of the present invention at the transfer level. The I/O channel 34, the buffer memories 35 and 36, CPU 37, buffer memories 43 and 44, the I/O channel 47, the drum 50, and the control 53 are shown in greater detail than in FIGURE 1. For convenience, components of the system as illustrated will be referred to with the following notations.

by way of channel 165. The output from WCC logic 132 resets DW counter 130 and enables TS adder 129.

The CPU 37 is coupled by way of channels 151, 152, and 153 to MC logic 53. MC logic 53 is coupled by way of address channel 154 and memory address (MA) register 155 to the memory 156. MC logic 53 is also connected by way of channels 156 and 157 to the memory data (MD) register 158.

Preparatory to operation, the registers are initialized. After initialization, the first data word from the magnetic tape 101 requests memory access. The ILB memory contents are transferred to the IA register 103. The first word from the magnetic tape 101 is then stored in the LIB buffer 35 by way of the MD register 158. The location in LIB buffer 35 is specified by the address transferred by way of the MA register 155. The address in unit 103 is then incremented by one from IINC logic 109. The new address in IA register 103 is then tested against the address in IM register 106 by IBMC logic 107 and is also tested against the address in IUB register 105 by the IBUC logic 108. When the two addresses thus compared correspond with one another, the comparison is transmitted to CPU 37. When LIB buffer 35 is full, CPU 37 asks for memory access and carries out the transposition of the matrix in LIB buffer 35. The transposed matrix is stored in LOB buffer 43. The transposed matrix thus stored in LOB buffer 43 is then transferred by way of OD register 110 to the magnetic drum 50 by way of channel 148. Under the control of the unit **53*a*, the successive columns of each transposed submatrix are stored on different tracks on the drum 50. During the time interval that the CPU 37 transposes the submatrix in LIB buffer 35 and stores it in LOB buffer 43, the drum control 53*a* directs successive blocks of data from MT unt 101 to UIB buffer 36**.

| Component | Reference | Reference No. |
|---|---|---|
| (I/O channel 34—Input Section) | | |
| Input data register | ID register | 102 |
| Input address register | IA register | 103 |
| Input buffer lower bound register | ILB register | 104 |
| Input buffer upper bound register | IUB register | 105 |
| Input buffer mark register | IM register | 106 |
| Input buffer mark comparison logic | IBMC logic | 107 |
| Input buffer upper bound comparison logic | IBUC logic | 108 |
| Input buffer address incrementing logic | IINC logic | 109 |
| (I/O channel 47—Output Section) | | |
| Output data register | OD register | 110 |
| Output address register | OA register | 111 |
| Output buffer lower bound register | OLB register | 112 |
| Output buffer upper bound register | OUB register | 113 |
| Output buffer mark register | OM register | 114 |
| Output buffer mark comparison logic | OBMC logic | 115 |
| Output buffer upper bound comparison logic | OBUC logic | 116 |
| Output buffer address incrementing logic | OINC logic | 117 |
| (Magnetic Drum Control Unit 53a) | | |
| Drum sector address counter | SA counter | 126 |
| Track address register | TA register | 127 |
| Track increment register | TI register | 128 |
| Track sector selection adder | TS adder | 129 |
| Drum word counter | DW counter | 130 |
| Drum words per segment register | WPS register | 131 |
| Drum word counter comparison logic | WCC logic | 132 |

The magnetic tape (MT) unit 101 is connected to ID register 102. Data channels 140 and 141 connect the ID register 102 and IA register 103, respectively, to the memory control unit 53. Control channels 142 and 143 connect the IBMC logic 107 and IBUC logic 108, respectively, to the CPU 37. IUB register 105 is connected to IBUC logic 108. ILB register 104 is coupled to IA register 103. IA register 103 is also coupled to IINC logic 109 and to IBMC logic 107 and to IBUC logic 108. IM register 106 is coupled to the IBMC logic 107.

The I/O channel 47 is comprised of elements corresponding with the elements in I/O channel 34. Data channels 144 and 145 connect the memory control 53 to the I/O channel 47 by way of OD register 110 and OA register 111. Control channels 146 and 147 connect OBMC logic 115 and OBUC logic 116 to the CPU 37. OD register 110 is then connected by way of data channel 148 to an input gate **50*a* on magnetic drum 50**.

The magnetic drum control unit **53*a* is connected to drum 50 by way of channels 148, 149, and 150. As SA counter 126 identifies the sector of a given track to which data from OD register 110 is to be directed. TA register 127 selects the track on which the data is to be stored. DW counter 130 is connected by channel 148 to I/O 47 and is responsive to OD register 110 to route data from OD register 110 to the drum 50. Channel 166 is a control channel coupling DW counter 130, WCC logic 132, and TS adder 129. TA register 127 selects a given track on drum 50. TI register 128 through TS adder 129 increments TA register 127 for selection of successive or spaced drum tracks. TA register 127 is incremented at the end of every column of data extracted from LOB memory 43 and UOB memory 44 as controlled by WPS register 131. The I/O channel 47 is coupled to DW counter 130**

The operation involves storing data words from magnetic tape 101 successively in LIB buffer 35 first at the ILB register address and continuing storage in LIB buffer 35 until the address in the MA register 155 corresponds with the address in IM register 106 for LIB buffer 35. When this condition is reached, the next data word is stored at the address in IUB register 105 in the UIB buffer 36. Thus, a new submatrix is stored in UIB buffer 36 while CPU 37 effects transposition of the matrix previously stored in the LIB buffer 35.

When UIB buffer 36 is full and the matrix in UIB buffer 35 has been transposed and stored in LOB buffer 43, the first word of the third submatrix from MT unit 101 is then stored in LIB buffer 35. During this time interval, the submatrix stored in UIB buffer 36 is transposed by the CPU 37 and stored in UOB buffer 44. At the same time, the transposed matrix is transferred from LOB buffer 43 via the I/O cnannel 47 to the magnetic frum 50. As a result, there is ultimately stored on drum 50 a set of time series, the members of the set equaling in number the number of channels on tape 20. The signals are now separated and in the same sequence as the signals originally recorded on the seismogram of FIGURE 1.

The sequence of the flow of data beginning with the first block and extending to the last block may be represented by the following table:

| Step | Data Flow |
|---|---|
| 1 | Block 1 ⟶ LIB. |
| 2 | Block 2 ⟶ UIB Block —LIB $\xrightarrow{T}$ LOB. |
| 3 | Block 3 ⟶ LIB; Block 2—UIB $\xrightarrow{T}$ UOB; Block 1 LOB ⟶ Drum. |
| 4 | Block 4 ⟶ UIB; Block 3—LIB $\xrightarrow{T}$ LOB; Block 2 UOB ⟶ Drum. |
| • | |
| • | |
| • | |
| n-2 | Block n ⟶ LIB; Block n-1—UIB $\xrightarrow{T}$ UOB; Block n-2—LOB ⟶ Drum. |
| n-1 | Block n—LIB ⟶ LOB; Block n-1—UOB ⟶ Drum. |
| n | Block n—LOB ⟶ Drum; |

where $\xrightarrow{T}$ involves the transposition represented by Equations 4 and 5.

Preparatory to operations, the I/O channel 34 is initialized as by storing in ILB 104 the first address of LIB buffer 35. The address stored in IM register 106 is the address at the boundary between ILB buffer and IUB buffer 36. The address stored in IUB register 105 is the starting address in UIB buffer 36. The program transfers the beginning address from ILB register 104 into the IA reigster 103. The address incrementing logic then sequentially increments IA register 103 until it corresponds with the contents of IM register 106. This means that buffer 35 is full. The next sequence of words is then stored in UIB register 36.

The I/O channel 47 is initialized by storing in OLB register 112 the first address in the LOB buffer 43. OM register 114 is loaded with the address OM and OUB register 113 is loaded with the address in the OUB buffer 44.

In control unit 53*a*, the sector address counter 126 is initialized. The initial track address is set in TA register 127. The TI register 128 is set to the increment necessary to select desired successive tracks. The WPS register 131 is loaded with the number of columns per multiplexed matrix, i.e., a number equal to *p*. The DW counter 130 is coupled as by channel 165 to count each word from OD register 110. When the output of DW register 130 equals the number stored in WPS register 131, the comparison logic 132 applies an incrementing pulse to TS adder 129 by way of channel 166 and a reset pulse to DW counter 130.

Figure 5:
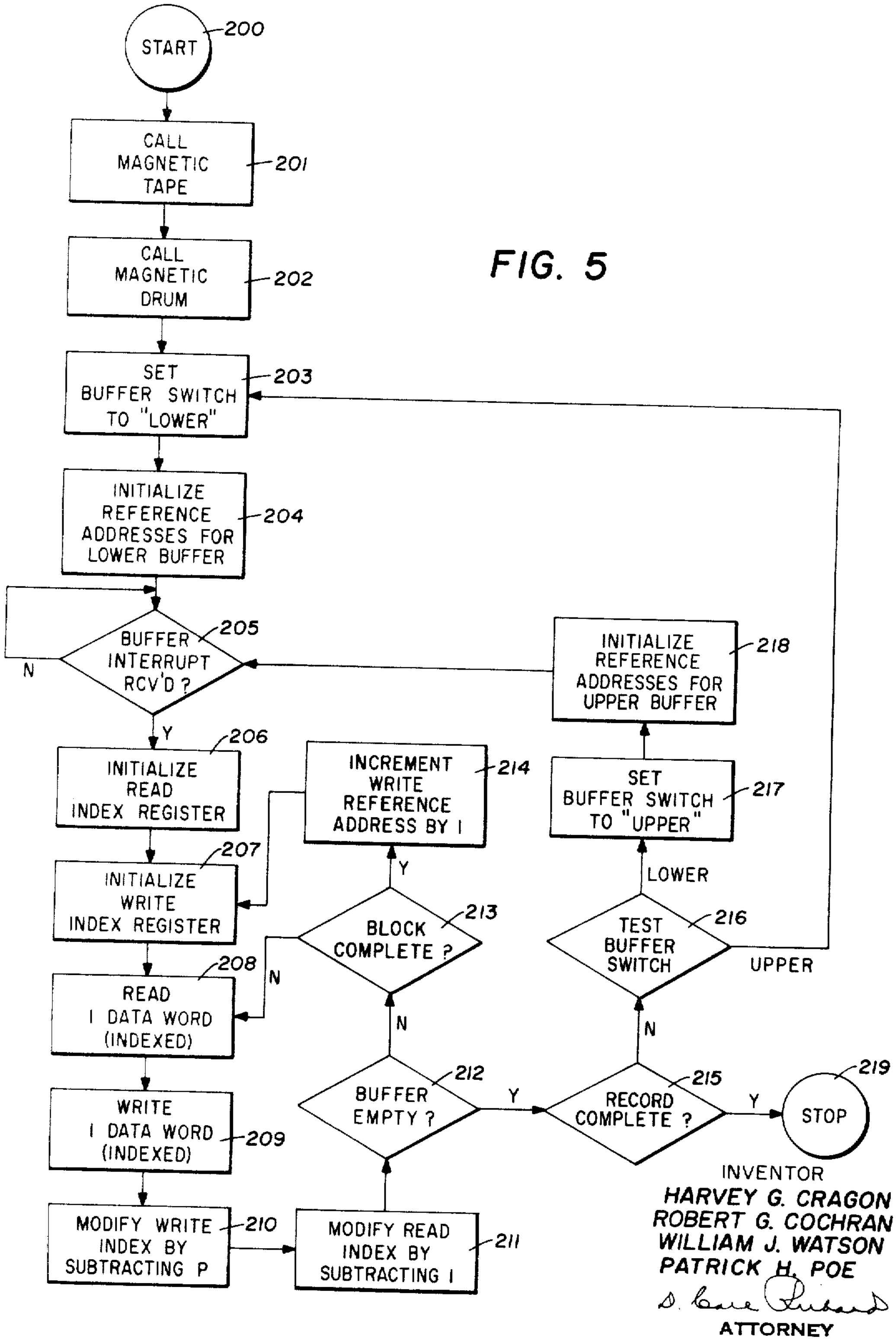
FIGURE 5 is a chart of program flow.

The program flow for carrying out this operation is shown in FIGURE 5. Following the start 200, the operation 201 involves selecting and making connection to the appropriate magnetic tape unit from the I/O channel 34. Operation 202 involves connecting the appropriate magnetic drum to the I/O channel 47. In operation 203 a buffer switch is set to the lower bound storage LIB buffer 35. In operation 204 all address registers are initialized as above described to direct data words initially to the lower bound LIB buffer 35. In operation 205, if a buffer interrupt signal from the control 53 is received, then operation 206 is initiated wherein the read index register in unit 158 is initialized. In operation 207, the write index register in unit 158 is initialized. In operation 208, the first data word is read from LIB buffer 35 and the read register is indexed or incremented by one. In operation 209, the first data word from LIB buffer 35 is transferred through CPU 37 to the first address in LOB buffer 43. In operation 210, the write index is modified by subtracting a number equal to *p*, i.e., the number of blocks per matrix. In operation 211, the read index for LIB buffer 35 is modified by subtracting one. In operation 212, a check is made to see if the LIB buffer 35 is empty. If it is not empty, then in operation 213 a check is made to see if the first block is complete. If it is not, then the loop involving operations 208–213 is repeated till the end of the first block. After the first block is completed, operation 214 is carried out wherein the write index is modified by an increment of one. Thereafter, the words in the second block are read from LIB suffer 35 and placed in LOB buffer 43 by following the sequence of operations 208–213. This sequence is continued until LIB buffer 35 is empty. When LIB buffer 35 is empty, operation 215 checks to see if the record is complete. If the record is not complete, then in operation 216, a check is made to see if the buffer switch is set to the UIB buffer 36 or to the LIB buffer 35. If set to the LIB buffer 35, then in operation 217, the buffer switch is set to the UIB buffer 36. Thereafter, in operation 218, the reference addresses for UIB buffer 36 are initialized. Following this, the operations 205–214 are repeated until the UIB buffer 36 is empty. When this is the case, operation 216 is followed in response to the buffer switch being set to the UIB buffer 36 and operation 203 resets the buffer switch again to the LIB buffer 35.

The data words then stored in the buffers 43 and 44 are read from sequential addresses onto the drum under the control of the unit 53*a*. The first *p* words from LOB buffer 43, for example, will be placed on track 1, sector 1 of the drum. The second set of *p* words from LOB buffer 43 will be read onto sector 1 of a track identified as track 1 plus the increment in TI register 128. Such an operation is continued until the contents of the LOB buffer 43 are stored in groups of *p* on separate tracks on drum 50. Thereafter, the words stored in UOB buffer 44 are read sequentially in groups of *p*. The first group of *p* words is stored on the second sector of the first track on drum 50 and thus immediately adjacent to the group of *p* words previously stored on sector 1, track 1. The second set of *p* words from buffer 44 are stored on sector 2 of the second track identified as track 1 plus the increment from adder 128 and thus are adjacent to the words stored in sector 1 of the same track.

It will be recognized that the demultiplexing operation thus described may be reversed merely by changing the operations 210, 211 and 214 by interchanging the words "read" and "write." That is, operation 210 would, for multiplexing operations, be changed to read "modify write index by subtracting *p*." Similarly, the operation 211 would involve modifying the write index by subtracting one. The operation 214 would involve incrementing the read index address by one.

The controller 53, through the control section 53*a*, provides for a segmented mode of operation on the drum and utilizes the following information:

(a) the number of words per segment *p* (see Equation 4);

(b) the number of segments per track *q*; and (c) the number of tracks to be skipped.

This number equals the number of tracks required to hold one completely recommutated trace.

The drum data is thus processed beginning with the starting address and continuing until the number of words per segment has been reached. Then the drum skips the number of tracks indicated in the TA register 127 and continues. One pass of the drum is required for transmitting each submatrix.

If the foregoing description is taken to refer to writing data onto the drum, it will be understood that data may be read in completely decommutated from using the number of segments per track parameter to index the drum from one track to another at the proper intervals, that is, as each trace is completed. The entire process as above noted is reversible for recommutating data which has been decommutated for processing. In this case, the traces are read from the drum in the same order in which they are written and the transposed submatrices are restored to their original form.

Having described the invention in connection with certain specific embodiments thereof, it is to be understood that further modifications may now suggest themselves to those skilled in the art and it is intended to cover such modifications as fall within the scope of the appended claims.

What is claimed is:

1. Apparatus for carrying out a conversion between multiplexed and demultiplexed digital data words which represent the sampling *m* time varying signals with each signal being sampled sequentially and with each signal being sampled *p* times during each interval of time *q*, said apparatus comprising:

(a) a first means adapted to sequentially produce said data words in *q* sequences, each sequence containing *p* blocks of words with each block containing *m* words, each word in a block representing a sampling of a different one of said signals whereby each said sequence appears in the order $a_{11}, a_{21} \ldots a_{m1}, a_{12}, a_{22} \ldots a_{m2}, a_{1p}, a_{2p} \ldots a_{mp}$, (b) second means for producing a control signal in predetermined time relation to each said sequence, (c) first and second addressable storage means, (d) third and fourth addressable storage means, (e) processing means responsive to said first means for directing said data words into said first storage means in response to alternate ones of said control signals and for directing said data words into said second storage means in response to the remaining ones of said control signals, (f) said processing means including means for causing the words in each said sequence to be stored in one of said first and second storage means at successive addresses in the order in which said words are produced by said first means, (g) said processing means being further responsive to alternative ones of said control signals for transferring said data words from said second storage to said fourth storage means and responsive to the remaining alternative ones of said control signals for transferring said data words from said first storage means to said third storage means whereby said processing means is operative to transfer data words out of one of said first and second storage means while the other of said first and second storage means is receiving data from said source, and (h) said processing means including means for reading data words out of said first and second storage means in a sequence whereby the *p* data words derived from a particular set of signals *m* are read out in the sequence $a_{11}, a_{12}, \ldots a_{1p}, a_{21}, a_{22}, \ldots a_{2p}, \ldots a_{m1}, a_{m2}, \ldots a_{mp}$.

2. The combination according to claim 1 wherein said data words initially are in multiplexed form.

3. The combination according to claim 1 wherein said data words initially are in demultiplexed form.

4. Apparatus for demultiplexing multiplexed digital data words derived from sampling *m* time varying signals with each signal being sampled sequentially and with each signal being sampled *p* times during each interval of time *q*, said apparatus comprising:

(a) a first means adapted to sequentially produce said data words in *q* sequences, each sequence containing *p* blocks of words with each block containing *m* words, each word in a block representing a sampling of a different one of said signals whereby each said sequence appears in the order $a_{11}, a_{21} \ldots a_{m1}, a_{12}, a_{22}, \ldots a_{m2}, a_{1p}, a_{2p} \ldots a_{mp}$, (b) second means for producing a control signal in predetermined time relation to each said sequence, (c) first and second addressable storage means, (d) third and fourth addressable storage means, (e) processing means responsive to said first means for directing said data words into said first storage means in response to alternate ones of said control signals and for directing said data words into said second storage means in response to the remaining ones of said control signals, (f) said processing means including means for causing the words in each said sequence to be stored in one of said first and second storage means at successive addresses in the order in which said words are produced by said first means, (g) said processing means being further responsive to alternative ones of said control signals for transferring said data words from said second storage to said fourth storage means and responsive to the remaining alternative ones of said control signals for transferring said data words from said first storage means to said third storage means whereby said processing means is operative to transfer data words out of one of said first and second storage means while the other of said first and second storage means is receiving data from said source, and (h) said processing means including means for reading data words out of said first and second storage means in a sequence whereby the *p* data words derived from a particular set of signals *m* are read out in the sequence $a_{11}, a_{12}, \ldots a_{1p}, a_{21}, a_{22}, \ldots a_{2p}, \ldots a_{m1}, a_{m2}, \ldots a_{mp}$.

5. A system for demultiplexing *m* multiplexed signals which are ordered in successive time blocks, with each block including one word from each of said *m* signals, which comprises:

(a) a buffer memory having four storage areas each of capacity to receive one submatrix of data words where each submatrix is made up of *p* blocks, (b) means for storing said submatrices of said data words alternately in a first and second of said areas, (c) means for alternately and successively transposing submatrices stored in said first and second areas for storage in third and fourth areas of said memory while storing said second submatrix and a third submatrix in said second and first areas, respectively, (d) a drum, and (e) means for transferring different columns of the first transposed submatrix from said memory to separate tracks on said drum and for transferring like columns of succeeding transposed submatrices on corresponding tracks on said drum with the columns of said succeeding transposed submatrices forming continuous drum data tracks with the columns of the first transposed submatrix with the signals forming the multiplexed time series on separate drum tracks in the relationships existing in said signals before multiplexing.

6. The combination set forth in claim 5 wherein means are provided for storing the first word in the members of each pair of said submatrices at addresses in said first and second areas, respectively, each of which are spaced *pxm* storage locations from a marker address and for storing successive words in each of said submatrices at addresses sequentially closer to said marker address.

7. The combination set forth in claim 5 wherein means are provided for transferring data words sequentially stored in said first area to said third area at addresses spaced $m$ storage locations apart for a first set of $m$ data words and for storing the data words in the second set of $m$ words at successive addresses next adjacent to data words previously stored in said third area.

References Cited

UNITED STATES PATENTS

| | | | |
|---|---|---|---|
| 3,366,924 | 1/1968 | Brown | 340—15.5 |
| 3,345,608 | 10/1967 | Brown et al. | 340—15.5 |
| 3,340,499 | 9/1967 | Hadley | 340—15.5 |
| 3,333,247 | 7/1967 | Hadley et al. | 340—172.5 |
| 3,142,043 | 7/1964 | Schrimpf. | |
| 3,074,636 | 1/1963 | Baker et al. | |
| 3,016,194 | 1/1962 | Bensky et al. | |
| 3,012,227 | 12/1961 | Astrahan et al. | |
| 2,916,210 | 12/1959 | Selmer. | |

PAUL J. HENON, *Primary Examiner.*

GARETH D. SHAW, *Assistant Examiner.*